(12) United States Patent
Hagg et al.

(10) Patent No.: US 11,338,757 B2
(45) Date of Patent: May 24, 2022

(54) AIRBAG UNIT FOR A VEHICLE SEAT

(71) Applicant: Autoliv Development AB, Vargarda (SE)

(72) Inventors: Mikaela Hagg, Vårgårda (SE); Malin Leijer, Lidköping (SE); Mats Berntsson, Alingas (SE); Kevin Wikstedt, Trollhättan (SE); Par Sandinge, Alingsas (SE); Fredrik Kjell, Alingsas (SE); Jules Houessou, Gothenburg (SE); Carl-Johan Svensson, Vårgårda (SE); Hanna Karlsson, Stora Levene (SE); Ola Henriksson, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/973,209

(22) PCT Filed: Jun. 13, 2019

(86) PCT No.: PCT/EP2019/065583
§ 371 (c)(1),
(2) Date: Dec. 8, 2020

(87) PCT Pub. No.: WO2019/238871
PCT Pub. Date: Dec. 19, 2019

(65) Prior Publication Data
US 2021/0261079 A1 Aug. 26, 2021

(30) Foreign Application Priority Data
Jun. 13, 2018 (EP) .................................... 18177616

(51) Int. Cl.
*B60R 21/207* (2006.01)
*B60R 21/231* (2011.01)
*B60R 21/00* (2006.01)

(52) U.S. Cl.
CPC ...... *B60R 21/207* (2013.01); *B60R 21/23138* (2013.01); *B60R 2021/0048* (2013.01);
(Continued)

(58) Field of Classification Search
None
See application file for complete search history.

(56) References Cited

U.S. PATENT DOCUMENTS 7,484,753 B2 * 2/2009 Sugimoto ............. B60R 21/207
280/730.1
9,573,553 B2 * 2/2017 Ko ........................ B60R 21/207
(Continued)

FOREIGN PATENT DOCUMENTS

DE        92 02 725 U1      8/1992
DE    102009040641 A1 *    4/2010   ............. B60R 21/21
(Continued)

*Primary Examiner* — Faye M Fleming
(74) *Attorney, Agent, or Firm* — Harness, Dickey & Pierce, P.L.C.; Stephen T. Olson (57) ABSTRACT

There is proposed a vehicle seat configured to support an occupant (401) in a sitting position, the seat comprising: a squab (27), a backrest (28), and an airbag unit. The airbag unit comprises an inflatable bag (1) and an inflator (34). The airbag comprises an inflatable chamber (8, 9; 208). The airbag further comprises an inflatable guide (2), connected to the inflator and the inflatable chamber. Upon actuation of said inflator, said inflatable guide is at least partially inflated before the inflatable chamber, thereby initially urging the inflatable chamber away from the backrest of the seat. The airbag is configured such that after the inflatable guide is at least partially inflated, the inflatable chamber inflates into a deployed position in which it defines an inflated shroud (Continued)

which extends over said sitting position and provides lateral protection to said occupant of the seat in said sitting position.

18 Claims, 10 Drawing Sheets

(52) U.S. Cl.
CPC ............... *B60R 2021/2074* (2013.01); *B60R 2021/23161* (2013.01)

(56) References Cited

U.S. PATENT DOCUMENTS

| | | | |
|---|---|---|---|
| 9,944,246 B2* | 4/2018 | Ohno | B60R 21/231 |
| 10,112,570 B2* | 10/2018 | Barbat | B60N 2/143 |
| 10,189,431 B2* | 1/2019 | Yamamoto | B60R 21/207 |
| 10,315,606 B2* | 6/2019 | Ohno | B60R 21/207 |
| 10,471,920 B2* | 11/2019 | Dry | B60R 21/233 |
| 10,710,539 B2* | 7/2020 | Cho | B60R 21/207 |
| 10,967,826 B2* | 4/2021 | Henriksson | B60R 21/235 |
| 2010/0219619 A1 | 9/2010 | Sugimoto | |
| 2017/0158155 A1 | 6/2017 | Ohno et al. | |
| 2019/0054884 A1* | 2/2019 | Dry | B60R 21/2338 |

FOREIGN PATENT DOCUMENTS

| | | | | |
|---|---|---|---|---|
| DE | 10 2009 037279 A1 | | 2/2011 | |
| DE | 102014201474 A1 | * | 7/2015 | ........... B60R 21/207 |
| EP | 1 772 327 A2 | | 4/2007 | |
| EP | 3 098 116 A1 | | 11/2016 | |

\* cited by examiner

AIRBAG UNIT FOR A VEHICLE SEAT

The present invention relates to a vehicle seat, and more particularly relates to a vehicle seat equipped with an airbag unit to provide protection to an occupant of the seat in the event of a crash.

In order to prevent or reduce injuries to occupants of motor vehicles arising from accidents involving side impacts, oblique impacts, or involving a motor vehicle rolling over, it has been previously proposed, and indeed is now common, to provide vehicles with so-called inflatable curtains ('IC'). Conventional ICs are usually mounted along the lateral sides of the vehicle structure, above the side windows. In an appropriate accident situation, as determined by one or more crash sensors and a specially configured electronic control unit, the inflatable curtains are deployed, via inflation, into a deployed position in which they extend downwardly from their initial storage and mounting positions so as to substantially cover the side windows of the motor vehicle and thereby protect the torso and/or head of an occupant of the vehicle from injury through forcible impact from the side structure of the vehicle and/or by passing through a side window of the window.

Whilst ICs have proved to be effective in protecting an occupant of a motor vehicle from injury via impact with the structure of the vehicle located proximate the occupant, they are generally ineffective in preventing injury in the event that the occupant's torso is urged towards the middle of the motor vehicle and thus away from an adjacent side structure of the motor vehicle—as would be the case, for example, for an occupant sitting in a left-hand seat of the motor vehicle in the event of a side impact from the right-hand side of the vehicle. Clearly, in such an accident situation, the inertia of the occupant's torso will cause the occupant's torso to move laterally towards the centre of the vehicle, which will thus be away from an immediately adjacent left-hand IC of the vehicle. Furthermore, the right-hand IC of the vehicle will be ineffective in protecting the seat occupant in question, because it is provided on the opposite side of the vehicle to that in which the occupant is sitting.

Is has therefore been proposed to mount side airbag ("SAB") devices on both sides of a vehicle seat in order to protect an occupant of the seat in the case of impacts from either side of the motor vehicle. Such SABs may be mounted to a vehicle seat such that an airbag will deploy on either side of the seat in the event of a crash, as determined by one or more crash sensors. Such SABs have become common in recent years. Conventional SABs are arranged to deploy from respective side regions of the seat's backrest, and whilst this can provide useful protection for a seat occupant's torso, the occupant's neck and/or head is still left vulnerable to injury because the occupant's head remains substantially unrestrained in a side impact, oblique impact, or rollover type accident. It has therefore become common to install SABs in combination with ICs. However, even in such installations comprising both ICs and SABs, the problem still exists that the seat occupant may be provided with insufficient protection for his/her head in event of an impact which urges his/her torso and head away towards the centre of the motor vehicle and thus away from the adjacent side structure of the motor vehicle where the adjacent IC is installed. There is therefore a need for an airbag arrangement which addresses this remaining problem.

Furthermore, automotive technology is advancing at an extremely fast rate, and in particular in the area of so-called 'autonomous driving'. As and when motor vehicles become capable of fully autonomous driving, it is envisaged that the designers of vehicle interiors will be released from conventional design constrains, and could begin designing vehicle seats which are very different to those which are common today and have been common for many years. For example, in a fully autonomous vehicle which is capable of driving under the management of its own computer systems, without inputs or management by a human driver, it is envisaged that the front seats of the vehicle could be configured to rotate or swivel about a vehicle axis so that the occupants of those seats could face rearwardly, or even at oblique angles relative to the direction of travel of the vehicle. In such arrangements the convention IC and/or SAB type airbags which are common today may offer insufficient protection to the seat occupant when the vehicle seat is in a new position. For example, where a vehicle seat is positioned so that the occupant is facing in a direction which is oblique relative to the driving direction of the vehicle, then the IC installed in the side structure of the vehicle will not be positioned appropriately relative to the position of the seat to provide effective protection to the seat occupant.

Moreover, with the increasing trend of vehicle seat mounted airbags, for example those which enclose the seat occupant using an airbag built into the seat, it is important to ensure that the deployment of these airbags is performed in a manner which does not (i) snag or catch on features of the vehicle seat; or (ii) become stuck or wedged between the seat and the seat occupant.

The present invention seeks to provide an improved vehicle seat equipped with an airbag unit to provide protection to an occupant of the seat in the event of a crash.

According to the present invention, there is provided a vehicle seat configured to support an occupant in a sitting position, the seat comprising: a squab, a backrest, and an airbag unit; the airbag unit comprising an inflatable bag provided in an initially rolled and/or folded airbag package, and an inflator actuable to direct inflating gas into the airbag to inflate the airbag into an inflated configuration; the airbag comprising an inflatable chamber; characterized in that the airbag further comprises an inflatable guide, connected to inflator and the inflatable chamber, the airbag being mounted and configured such that, upon actuation of said inflator to inflate the airbag, said inflatable guide is at least partially inflated before the inflatable chamber, thereby initially urging the inflatable chamber away from the backrest of the seat; wherein the airbag is configured such that after the inflatable guide is at least partially inflated, the inflatable chamber inflates into a deployed position in which it defines an inflated shroud which extends over said sitting position and provides lateral protection to said occupant of the seat in said sitting position.

Optionally, the inflatable guide may be formed in a lobe of the airbag.

Conveniently, an inflatable volume of the inflatable guide is smaller than an inflatable volume of the inflatable chamber. This can help ensure that the inflatable guide at least partially inflates before the inflatable chamber, and so act to urge the inflatable chamber away form the backrest of the seat.

Advantageously, the inflatable guide is positioned proximal to one or more inlet regions of the airbag. This can help ensure that inflating gases from the inflator reach the inflatable guide before they reach the inflatable chambers.

Optionally, the inflatable guide includes an inflatable volume which has a U or elongated O shape. Such a shape decreases the required inflation volume whilst still functioning as an effective guide to urge the inflatable chamber away from the backrest of the seat. The gap between the bars of the U, or between opposite edges of the elongate O may include one or more uninflatable regions edges of which thereby define the inflatable volume.

Conveniently, the inflatable guide may comprise a first uninflatable region and a second uninflatable region, which are not fluidly connected to the inflator. This can decrease the required inflation time and ensure that the inflatable guide urges the inflatable chamber away from the backrest before the inflatable chamber inflates to the deployed position.

Optionally, the first uninflatable region and the second uninflatable region are spaced apart. By spaced apart, it may be meant that the uninflatable regions are separated spatially when the airbag in an unpacked form and as viewed from a top-down perspective.

Advantageously, the first uninflatable region and second uninflatable region may be connected via an interconnecting seam.

Optionally, the interconnecting seam and a seam around the periphery of the inflatable bag may define an inflatable volume of the inflatable guide.

Conveniently, the interconnecting seam and two seams around the periphery of the inflatable bag may define two inflatable volumes of the inflatable guide.

Advantageously, the airbag may comprise two inflatable chambers physically connected to one another via a connecting interface and fluidly isolated from one another.

Optionally, the connecting interface between the inflatable chambers may be provided by a seam of the airbag.

Conveniently, the airbag may be one-piece woven, and said connecting interface may be defined by a region of the airbag in which the yarns of two constituent fabric layers of the airbag are interwoven.

Advantageously, the inflatable guide of the airbag unit may be provided in an upper portion of the backrest distal to the squab, and may be configured, when inflated, to extend over the occupant.

Optionally, the airbag unit may be provided in a rearward portion of the backrest, and may be configured, when inflated, to extend around the backrest and over the occupant.

Conveniently, the airbag may be substantially symmetrical about an axis bisecting the inflatable guide.

So that the invention may be more readily understood, and so that further features thereof may be appreciated, embodiments of the invention will now be described by way of example with reference to the accompanying drawings in which.

Figure 1:
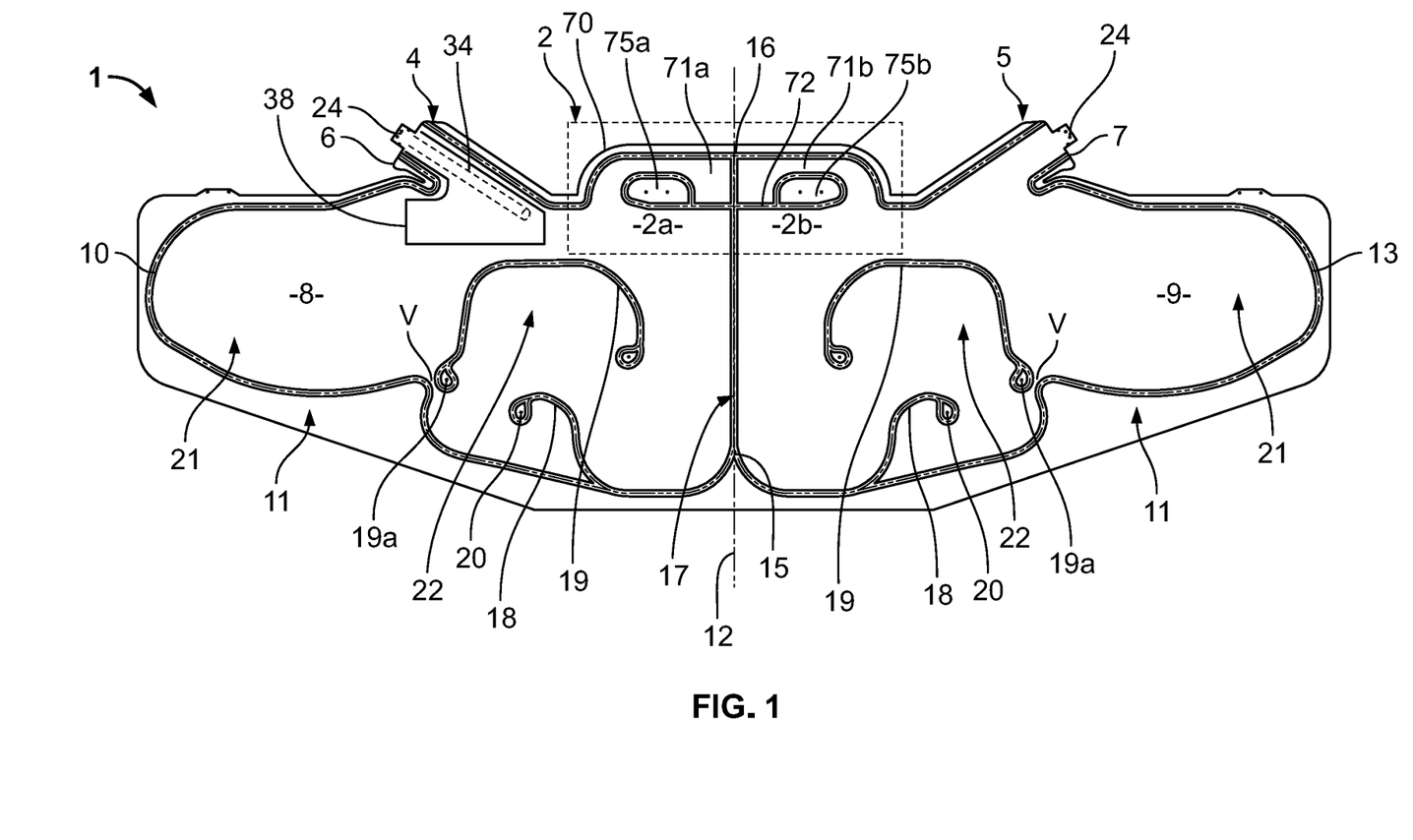
FIG. 1 shows a plan view of an unpackaged airbag which is suitable for installation in a vehicle seat in accordance with the present invention.

Referring initially to FIG. 1, there is shown an uninflated airbag 1 suitable for installation in a vehicle seat in accordance with the present invention. The airbag 1 illustrated is shown in an exemplary and relatively simple form to clearly illustrate aspects of the invention. However, other more complex airbag configurations may be used instead.

The airbag 1 is elongate in overall configuration and may be formed from two substantially identical sheets of flexible material, such as woven fabric, which are superimposed on one another and interconnected by a number of seams so as to define therebetween a large inflatable volume for the receipt of inflating gas from one or more inflates. As will be noted from FIG. 1, the sheets are elongate in form, and can be considered to be very generally rectangular in overall shape. The particular airbag 1 illustrated is configured to receive inflating gas from two discrete inflators, as will be described in more detail below, and is thus configured to have two inlet regions 4, 5 for cooperation with respective inflators. Each inlet region 4, 5 comprises a respective neck 6, 7 which is formed from cooperating and correspondingly-shaped protrusions of the two constituent sheets of flexible material.

The seams interconnecting the two sheets of flexible material are configured in such a way that the internal inflatable volume defined between the sheets is divided into two discrete inflatable chambers, generally indicated at 8 and 9 in FIG. 1. The inflatable chambers 8, 9 are of substantially equal physical size and have substantially equal inflatable volumes, with each representing at respective half of the airbag 1.

In the embodiment in FIG. 1, the left-hand inflatable chamber 8 (in the orientation of the airbag 1 illustrated in FIG. 1) is defined by a left-hand peripheral seam 10, which runs from one side of the left-hand neck 6, around a peripheral region of the left-hand region of the airbag 1 (in a somewhat tortuous or serpentine path indicated generally at 11), substantially along a central transverse axis 12 of the airbag in a straight line, and then along the periphery of the airbag 1 until it terminates at the opposite side of the left-hand neck 6. The two-sheets are unconnected between the start and end points of the peripheral seam 10, such that the end of the neck 6 remains open and thereby defines an inlet port for the receipt of an inflator in manner known per se.

The right-hand inflatable chamber 9 (in the orientation of the airbag 1 illustrated in FIG. 1) is defined by a right-hand peripheral seam 13 of similar configuration to the left-hand peripheral seam 10 described above. As will therefore be noted, the right-hand seam runs from one side of the right-hand neck 7, around a peripheral region of the right-hand region of the airbag 1 (in a somewhat tortuous or serpentine path indicated generally at 14), substantially along the central axis 12 of the airbag in a straight line, and then along the periphery of the airbag 1 until it terminates at the opposite side of the right-hand neck 7. The two sheets are unconnected between the start and end points of the peripheral seam 13, such that the end of the neck 7 remains open and thereby defines an inlet port for the receipt of an inflator in a manner known per se.

In the configuration described above, it will be appreciated that the two peripheral seams 10, 13 both extend substantially along the central axis 12 of the airbag 1. In some embodiments it is envisaged that the two peripheral seams 10, 13 will be superimposed along the axis 12 so as to create a double seam in that area. In other embodiments, however, it is envisaged that the two peripheral seams 10, 13 may each extend alongside the exact position of the axis 12, so as to be located on opposite sides of the axis 12 and generally adjacent one another. Other configurations are also envisaged in which only one of the peripheral seams 10, 13 will actually extend across the airbag 1 in the region of the axis 12, with the other peripheral seam stopping at a point where it meets the axis 12 (e.g. at 15 in FIG. 1) and then starting again at a point where it turns away from the axis 12 (e.g. at 16 in FIG. 1). In such an arrangement, the seam 10, 13 which extends along the axis 12 will thus serve to define both inflatable chambers 8, 9 in the region of the axis 12.

The region of the or each peripheral seam 10, 13 which extends along the axis 12 of the airbag thus serves to divide the airbag's total inflatable volume into the two inflatable chambers 8, 9. Furthermore, in the region of the axis 12, the or each peripheral seam 10, 13 also defines a connecting interface 17 which serves to physically interconnect the two inflating chambers 8, 9 whilst fluidly isolating the chambers 8, 9 from one another.

In addition to their respective peripheral seams 10, 13, each inflatable chamber 8, 9 may include one or more additional seems which also interconnect the two sheets of the airbag 1. In the arrangement of FIG. 1, the additional seems of each chamber 8, 9 include a respective relatively short front seem 18, and a somewhat longer central seam 19. Each front seam 18 extends from a front region of a respective peripheral seam 10, 13 generally proximate the central axis 12, towards a central region of the respective chamber 8, 9 in a somewhat S-shaped configuration and terminates at an end 20 which is located within the periphery of the respective inflatable chamber 8, 9. Each central seam 19 extends between two ends which are both located within the periphery of the respective inflatable chamber 8, 9 and has a generally n-shape configuration as viewed in the orientation of FIG. 1. One end 19a of each central seam 19 is positioned proximal to a respective peripheral seam 10, 13 thereby defining a gap between the end 19a of the central seam and the peripheral seam 10, 13. In the particular embodiment illustrated in FIG. 1, the end 19a of each central seam 19 is actually proximal to a somewhat re-entrant region of the adjacent peripheral seam 10, 13.

As will be appreciated by those of skill in the art of motor vehicle airbags, the additional seams 18, 19 are effective to sub-divide each inflatable chamber 8, 9 into a plurality of fluidly interconnected inflatable cells. In the airbag configuration illustrated in FIG. 1, each central seam 19 serves to divide the respective inflatable chamber into a thorax cell 21 located towards the respective end of the airbag, and a head cell 22 located towards the central region of the airbag. Each front seam 18 further sub-divides the head cell 22 of the respective inflatable chamber 8, 9 in order to provide a desired inflation characteristic to the airbag 1. The function and deployment of the various cells will become clear hereinafter. Additionally, it is to be noted that the terminal end 19a of each central seam 19, and the respective adjacent peripheral seam 10, 13 cooperate to define a small vent aperture V between the thorax cell 21 and the head cell 22 of the respective inflatable chamber 8, 9 the purpose of which is described hereinafter.

A central upper portion of the airbag 1 (in the orientation illustrated) provides an inflatable guide 2 (which may also be referred to as an inflatable ramp). In this example, the guide comprises two sub-regions 2a and 2b. The guide is formed of a lobe 70, which extends from an upper portion of the airbag, between the two inlet regions 4, 5, as shown in FIG. 1. Within the lobe are first and second uninflatable regions 75a, 75b which are fluidly isolated from the inflatable chambers 8 and 9. In use, these uninflatable regions do not inflate. The uninflatable regions may be provided with essentially no volume, or with an uninflatable volume.

The first and second uninflatable regions are connected by an interconnecting seam 72 which bisects the connecting interface 17 discussed above. The boundaries of the respective uninflatable regions 75a, 75b and the interconnecting seam 72 define inflatable volumes 71a and 71b respectively. Inflatable volume 71a is proximal to and fluidly connected to neck 6, and inflatable volume 71b is proximal to and fluidly connected to neck 7. The combined inflatable volume provided by volumes 71a and 71b can generally be described as having an elongated but interrupted O shape, formed of two unconnected U shaped regions back-to-back. For example, inflatable volume 71a may be considered as having a U shape with the bottom of the U proximal to neck 6. Similarly, inflatable volume 71b may be considered as having a U shape with the bottom of the U proximal to neck 7. The top of each of the U-shapes are therefore proximal to one another, and form an elongated O shape which is bisected by the connecting interface 17. When inflated, the respective U shapes increase in thickness whereas the space between the 'legs' of the U-shape, defined by the respective uninflatable region, does not increase.

Due to their relatively small volume, the volumes 71a and 71b of the guide 2 inflate quickly, and with comparatively little inflator gas, when the inflator is actuated and inflating gas flows from necks 6 and 7 to respective inflatable volumes 71a and 71b. As the lobe 70 extends away from the main body of the airbag 1, it can act to force the remainder of the airbag away from a surface adjacent to the lobe. The structure of the lobe, with the two inflatable regions 71a and 71b generally defining a ramp, means that the inflatable guide 2 is quickly inflated relative to the remaining inflatable volume of the airbag 1. Moreover, in a folded or packed configuration, the inflatable chambers 8, 9 may be rolled or folded more tightly than the inflatable guide 2. This can ensure that, when inflated, the inflatable guide 2 is at least partially inflated before the airbag completely unfolds or unrolls.

As will be appreciated by those of skill in the art of airbag manufacture, although the airbag 1 has been described above as being formed from two separate sheets of flexible material which are interconnected via a series of (for example, stitched) seems, it is envisaged that in variants of the invention the two sheets could be woven simultaneously via a so-called "one-piece weaving" technique, known per se, in which the warp and weft yarns forming the two layers are interwoven in selected areas to form interconnecting webs which are integral to the woven structure of the two sheets. In such an arrangement, it is envisaged that the resulting webs of interwoven warp and weft yarns may be provided in similar regions and have similar configurations to the above-described seems 10, 13, 18, 19, and will thus effectively replace the seams. In such a one-piece woven airbag, the connecting interface, 17 which servers to physically interconnect the two inflatable chambers 8, 9 whilst fluidly isolating them from one another, will be defined by a region of the airbag in which the yarns of the two constituent fabric layers of the airbag are interwoven. In such examples, the uninflatable regions 75a and 75b may be provided as interwoven regions thereby defining respective uninflatable regions. The interweaving may be performed such that there is essentially no volume between the sheets defining the uninflatable regions.

Figure 2:
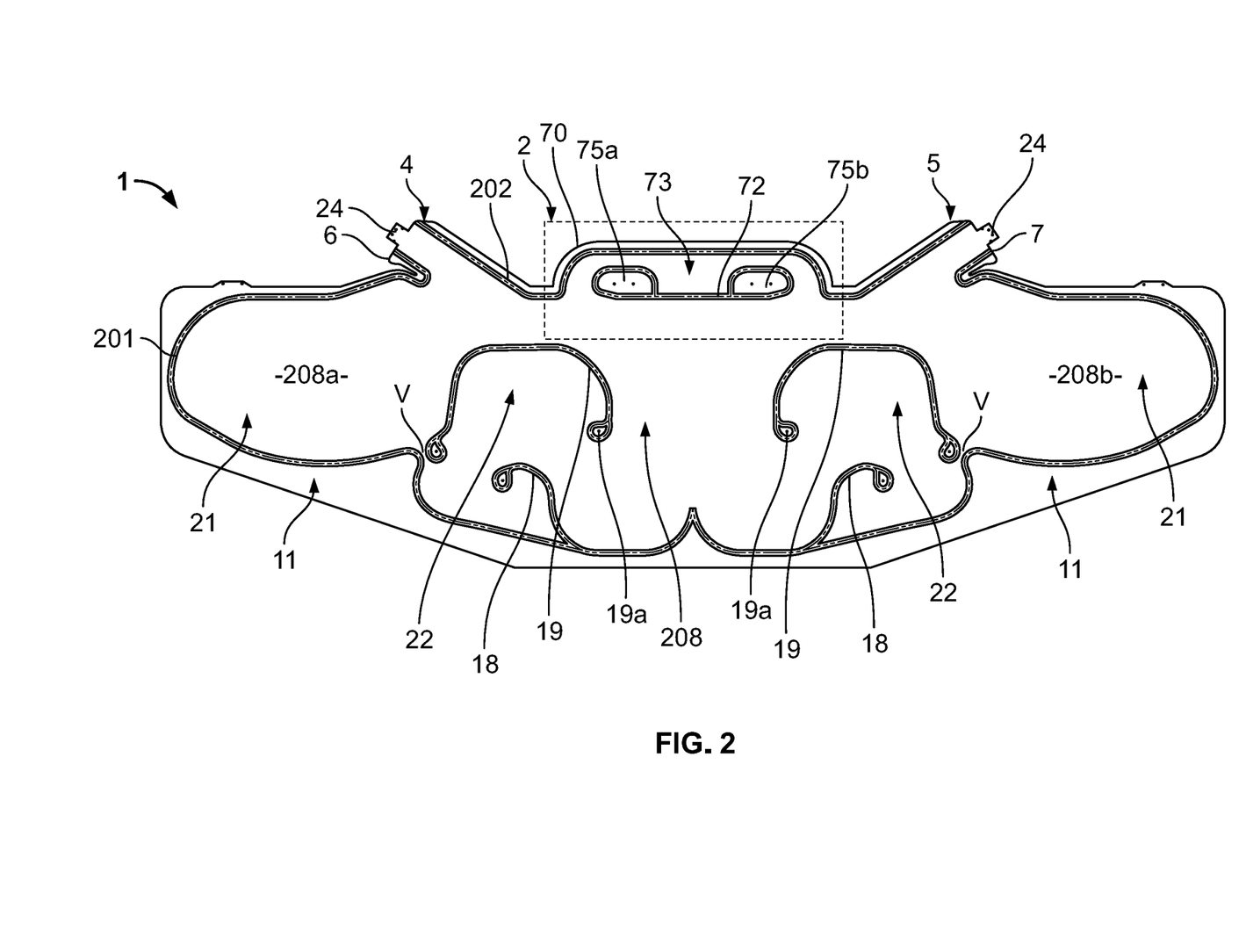
FIG. 2 shows a plan view of an alternative unpackaged airbag which is suitable for installation in a vehicle seat in accordance with the present invention.

An alternative embodiment of the airbag is shown in FIG. 2, where like features are indicated by like reference numerals. In this embodiment, there is no connecting interface 17 and so only a single inflatable chamber 208 is provided. The two halves of the single inflatable chamber are indicated by reference numerals 208a and 208b in FIG. 2. In this alternative embodiment of the airbag there are two peripheral seams 201, 202. The first seam 201 runs from a left-hand side of the left-hand neck 6 around the periphery of the airbag to the right-hand side of the right-hand neck 7, and the second seam 202 runs from the right-hand side of the left-hand neck 6 around the periphery of the airbag to the left-hand side of the right-hand neck 7 as illustrated. The structure of the inflatable guide 2 is substantially the same as that in FIG. 1, however as there is no connecting interface there is only a single inflatable portion 73 of the guide. In this example, the inflatable region 73 has a generally elongated O shape. The inner portion of the 0 shape includes the uninflatable regions 75a and 75b as well as the interconnecting seam 72. In contrast to the example in FIG. 2, the elongated O shape in this example is not interrupted as there is no connecting interface 17. Therefore, when the inflatable region 73 is inflated the thickness of the line forming the 0 shape increases, whereas the thickness of the space contained within the 0 shape, defined by the respective uninflatable region, does not increase.

Figure 3:
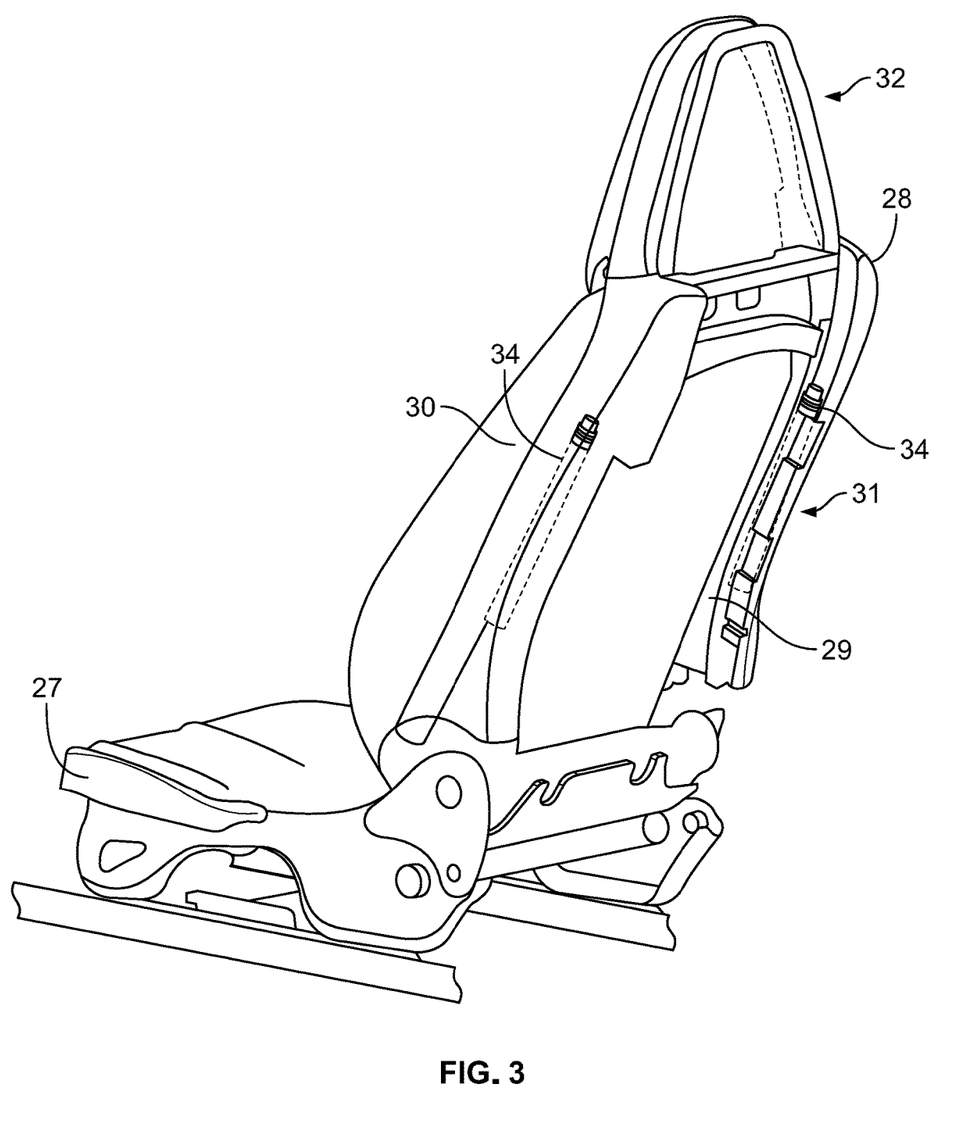
FIG. 3 is a schematic isometric view of a vehicle seat in accordance with the present invention, showing the seat from the rear and one side in a normal condition, prior to inflation of the airbag.

Turning now to consider FIG. 3, there is illustrated a motor vehicle seat in accordance with the present invention, which is equipped with an airbag unit comprising an airbag 1 of the type described above and illustrated in FIGS. 1 and 2. As is conventional, the seat comprises a squab 27 and a backrest 28, the backrest 28 extending generally upwardly from a rear region of the squab 27. As will be appreciated, the squab 27 and the backrest 28 cooperate to support an occupant in a conventional sitting position. The squab 27 and the backrest 28 both comprise an internal structure which may take the form of a metal frame, which is covered in upholstery. FIG. 3 shows the squab without its upholstery, but shows the backrest comprising a backrest frame 29 which supports upholstery 30 comprising a pair of laterally opposed side-bolsters in a conventional manner.

The backrest 28 of the seat illustrated in FIG. 3 comprises a lowermost abdominal region 31 and a headrest 32, the headrest 32 being positioned at the uppermost region of the backrest 28 and being configured to restrain the head of an occupant of the seat in a known manner. In the embodiment illustrated in FIG. 3, the headrest 32 is provided as an integrally formed part of the backrest 28, such that the backrest frame 29 defines both the abdominal region 31 and the headrest 32.

The seat is equipped with an airbag unit which comprises the airbag 1 illustrated in FIG. 1 or 2. The airbag 1 is initially provided in a rolled and/or folded package, which is mounted to the backrest 28 inside the backrest upholstery 30. Respective inflators 34 are inserted into each inlet opening 24 of the airbag 1, and the airbag is rolled and/or folded into an elongate package, after which the package is mounted to the seat. The airbag package extends from one lateral side of the backrest 28, around and over the headrest 32, to the opposite lateral side of the frame 29. The inflatable guide 2 in such an installation is disposed in or proximal to the headrest 32 of the seat, with the inflatable chambers 8, 9 extending down opposing lateral sides of the backrest frame. As such, in this example, the inflatable guide 2 will, upon inflation, extend across and over an uppermost surface of the headrest 32 and so urge the remaining airbag away from the headrest either in a direction away from the squab 27 (i.e. towards the roof of a vehicle to which the seat is fitted) or in a direction away from the headrest 32 and generally parallel to the roof of the vehicle to which the seat is fitted. In an alternative example, the elongate package is installed entirely within the backrest, such that the inflatable guide 2 is located in a portion of the backrest 28 adjacent or near to the headrest 21. As such, in this example, the inflatable guide 2 will, upon inflation, extend up the rearward surface of the backrest 32 before extending across and over an uppermost surface of the backrest 32.

It is proposed that each inflator 34 will be securely fastened to a respective lateral region of the backrest 28, for example via one or more mounting spigots which extend through respective mounting apertures (not shown) formed in the inlet regions 4, 5 of the airbag in a manner known per se, so as to anchor the inlet regions 4, 5 of airbag 1 relative to the backrest 28. It is furthermore proposed that the airbag 1 may be provided with mounting tabs for attachment to the backrest 28 when rolled and/or folder into the package, to provide additional securement to the backrest 28. In other arrangements it is envisaged that the airbag package may additionally comprise a rupturable wrapper or covering provided around the rolled and/or folded airbag, and that the wrapper or cover may also be mounted to the backrest 28 (for example via mounting tabs) to further secure the airbag 1 to the backrest 28.

The inflators 34 are of substantially identical configuration to one another, with each having an elongate and generally cylindrical form. Each inflator 34 comprises a plurality of outwardly directed gas outlet ports arranged circumferentially around one end, and is positioned within the respective inlet region 4, 5.

As will be appreciated by those of skill in the art of motor vehicle airbags, actuation of the inflators 34 is effective to rapidly produce a large volume of inflating gas which is directed through the outlet ports of the inflator 34 and into the internal inflatable volume of the airbag 1, via the respective inlet regions 4, 5, so as to cause the airbag to inflate very rapidly. Upon inflation, the airbag 1 deploys from the backrest 28 first in a direction away from the backrest. Depending on the mounting location of the airbag, this may be towards the roof of the vehicle, towards the rear of the vehicle, or towards the front of the vehicle. This initial inflation, which deflects the airbag away from the backrest is caused by the inflatable guide 2 discussed above, which at least partially inflates before the inflatable chambers or chamber fully inflates. A number of factors influence the inflation rate of the inflatable guide 2 relative to the inflatable chambers. As discussed above, the inflatable guide 2 may have a substantially smaller inflatable volume than the inflatable chambers (this partially being achieved by the inclusion of one or more uninflatable regions). Additionally, or alternatively, the airbag package may be wrapped or folded in such a manner that the inflatable guide 2 is less tightly wrapped or folded than the rest of the airbag, thereby allowing inflating gas to reach the inflatable guide 2 before the inflatable chambers. Further, the inflatable guide 2 may be located closer to the inlet regions 4, 5 so that inflating gases reach the inflatable guide before reaching the inflatable chambers. An additional factor, not illustrated, may be the provision of one or more guiding seams within the airbag which direct inflating gases preferentially in the inflatable guide 2.

After the initial deflection away from the backrest 28, the airbag deploys in a generally forward direction towards the front edge of the squab 27 remote from the backrest 28. In so doing, the airbag 1 will rupture or otherwise burst through the upholstery 30 of the backrest 28, for example via pre-formed tear seams or other areas of relative mechanical weakness in the upholstery 30.

In more detail, inflating gas is ejected from each inflator via its outlet ports within the respective inlet regions 4, 5. Some of the inflating gas is directed out of the respective inlet region 4, 5 and into either the respective volumes 71*a* and 71*b* or the inflatable volume 73 (depending whether it is the airbag of FIG. 1 or of FIG. 2). Generally, a larger proportion of the gas is initially directed into the inflatable guide 2 as compared to the inflatable volumes 8, 9 or 208. A first factor which includes this, is the proximity of the inflatable guide 2 to the inlet regions 4, and 5. Further factors include the use of a diffuser 38, in this example a "y-sock" diffuser and/or the inflatable guide 2 not being (or not as tightly being) rolled and/or folded. In the example shown in FIG. 1, a single diffuser is present in the left-hand inflatable chamber, in some examples there are no diffusers, and in yet other examples there is a diffuser in each of the left-hand inflatable chamber 8 and the right-hand inflatable chamber 9. Generally, the arrangement is thus configured to ensure that the inflatable guide 2 at least partially inflates before the inflatable chamber(s). This inflation characteristic is considered particularly desirable, as it causes the inflatable chamber(s) to be urged away from the backrest before they fully deploy. In more detail, as inflating gases enter the airbag 1, the thickness of the inflatable regions 71*a* and 71*b* increase and the inflatable guide 2 takes a generally rectangular ramp shape. This inflation of the inflatable guide 2 provides a force which acts on a part of the seat to which the airbag is fitted. The result of this force is to urge the remaining, as yet uninflated or at most partially inflated, airbag away from the seat. This provides clear space between the remaining airbag and the seat. As a result, the risk of the airbag being caught or snagged on any features of the seat (or of the occupant) are reduced.

As will be appreciated, when the thorax cells 21 become substantially fully inflated, gas is permitted to vent from the thorax cells 21 into the head cells 22 via the vent apertures V therebetween, thereby supplementing the flow of gas into the head cells 22 directly from the respective inlet region 4, 5 with a small additional flow of excess gas from the thorax cells 21. Additionally, the vent apertures V perform an important function in the event that the either of the thorax cells 21 is impacted and thus compressed by the seat occupant's body in the event of an accident involving a component of lateral force. In particular, the vent apertures V permit inflating gas within the thorax cells 21 to vent upwardly into the head cells 22 as the thorax cells become compressed under the force of the occupant's body, thereby allowing the thorax cells 21 to provide a cushioning effect to the occupant, whilst also thereby further increasing the inflation rate of the head cells 22.

Figure 4:
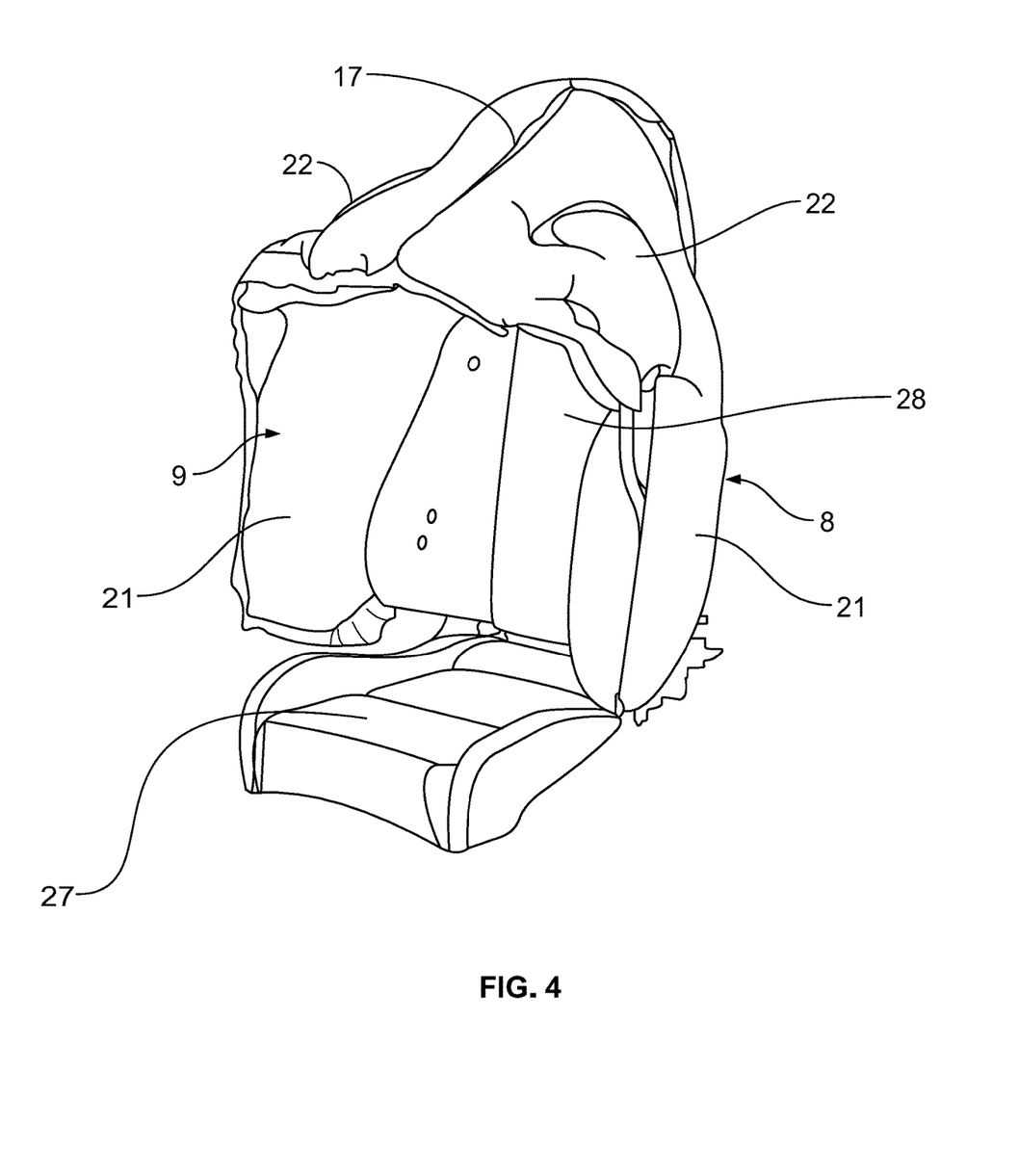
FIG. 4 is an isometric view of a vehicle seat in accordance with the invention, showing the seat in a condition in which the airbag has been deployed via inflation.

As illustrated most clearly in FIG. 4, once inflated, the two inflatable chambers 8, 9 of the airbag 1 inflate into respective deployed positions in which they: (i) extend forwardly from respective opposing and laterally spaced-apart side regions of said backrest 28; and (ii) extend upwardly, and laterally inwardly across an uppermost region of the seat, as defined by the head rest 32, towards the connecting interface 17 between the two chambers 8, 9. More particularly, the regions of the inflatable chambers 8, 9 defining the respective thorax cells 21 extend forwardly from respective opposing and laterally spaced-apart side regions of said backrest 28, and the regions defining the head cells 22 extend upwardly and laterally inwards cross the head rest 32. In this manner, the two inflatable chambers 8, 9 cooperate to define an inflated shroud around the backrest 28, and its head rest 32, so as to extend over an occupant's sitting position and provide lateral protection to the occupant of the seat in said sitting position. The inflatable guide 2 in this example is located on a rearward portion of the airbag, having extended up a rearward portion of the backrest 28.

Figure 5A:
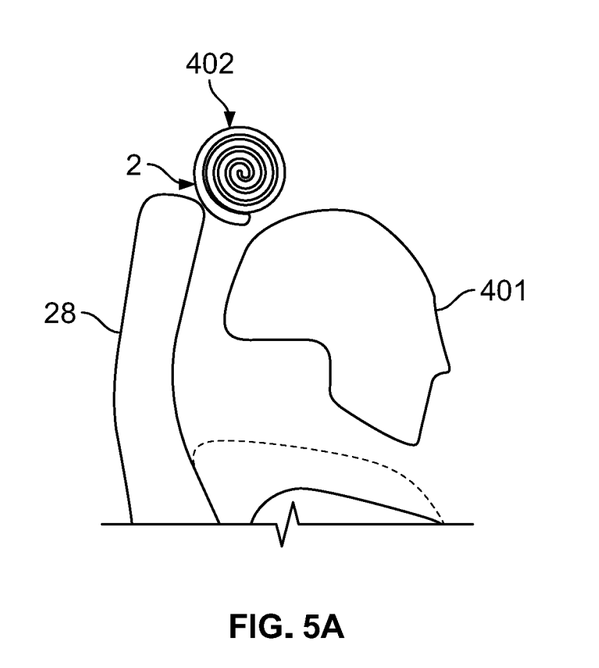
FIGS. 5a-5d show schematic side-on views of the vehicle seat during various stages of the deployment of the airbag.
Figure 5B:
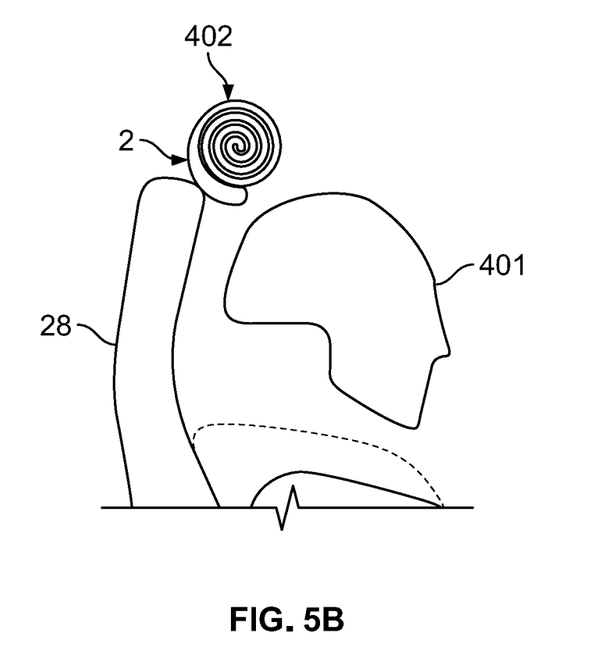
Figure 5C:
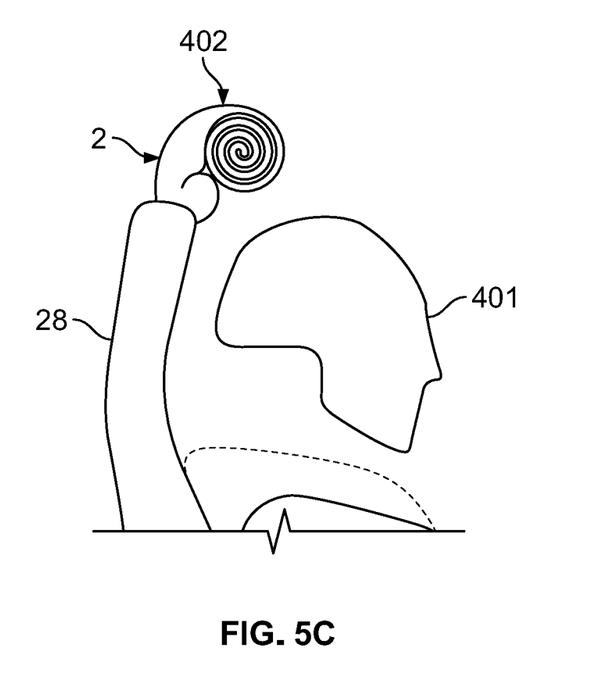
Figure 5D:
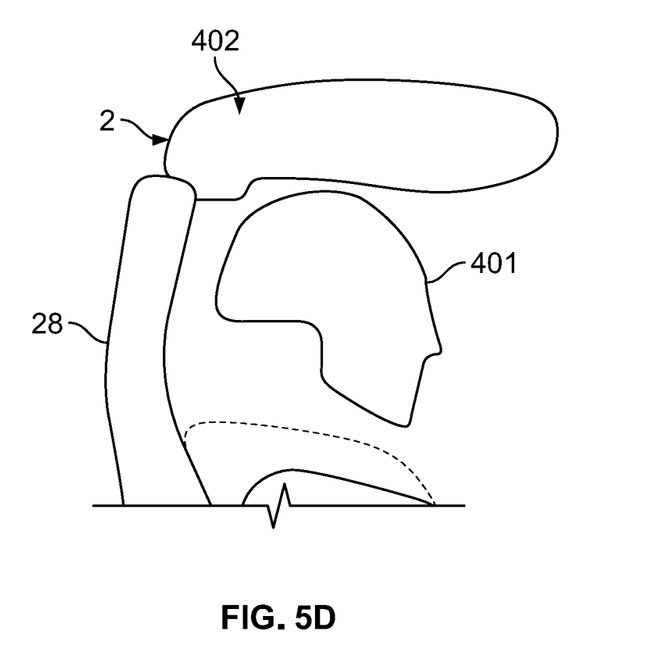

FIGS. 5*a*-5*d* show various stages of deployment of an airbag 1 according to the present invention when the inflatable guide is installed in an upper part of the backrest 28 e.g. in the headrest. In FIG. 5*a*, the airbag has begun deployment and so the inflatable guide 2 has started to inflate. Thus, as shown in FIG. 5*b*, the remainder of the airbag 402 is deflected away from the seatback 28 and the occupant 401 of the seat. As the inflatable guide 2 continues to inflate, the remainder of the airbag 402 is orientated so as to unfurl above the occupant 401 of the seat and so will not catch or snag on them. This is shown in FIG. 5*c*. In the final deployed state, shown in FIG. 5*d*, the inflatable guide 2 is fully inflated as is the remainder of the airbag 401.

Figure 6A:
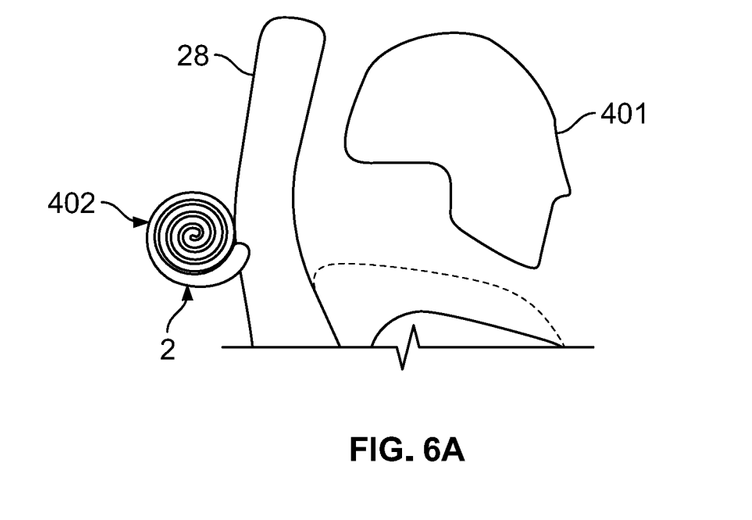
FIGS. 6a-6d show schematic side-on views of the vehicle seat during various stages of the deployment of an airbag positioned in an alternative position.
Figure 6B:
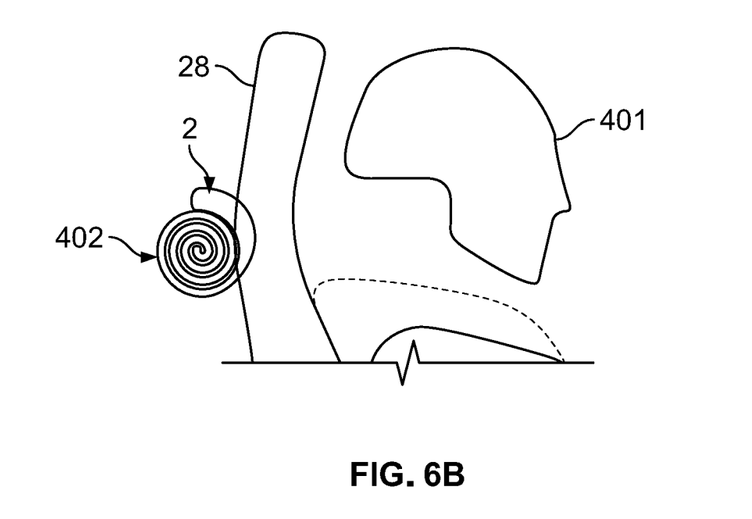
Figure 6C:
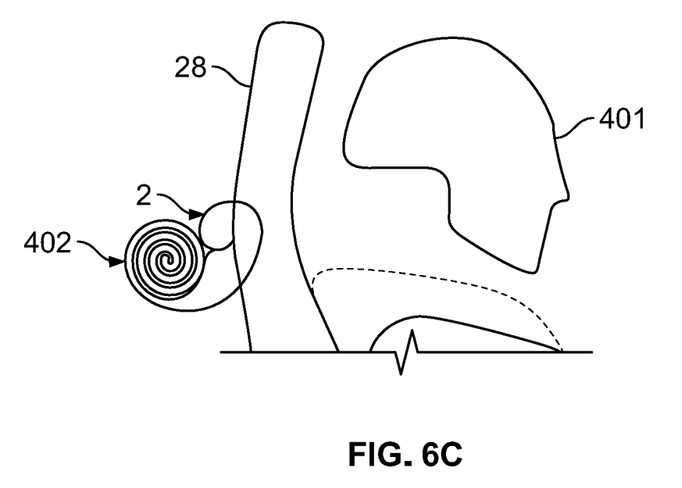
Figure 6D:
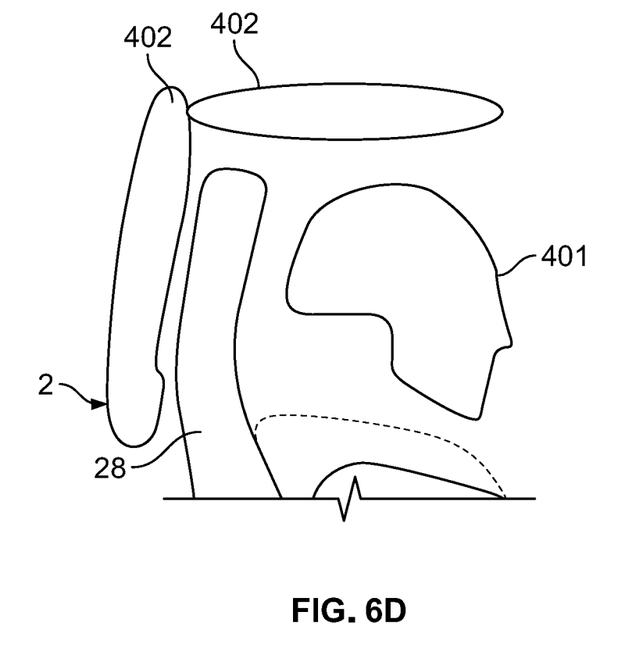

FIG. 6*a*-6*d* show various stages of deployment of an airbag 1 according to the present invention when the inflatable guide is installed in a rearward facing portion of the backrest 28. In this example, the inflatable guide is provided in a lowermost portion of the airbag package i.e. closest to the squab of the seat and the seat provides a backrest 28 which integrally forms a headrest. The remainder of the airbag may be packaged above the inflatable guide. In this example, a highest part of the airbag package is below an uppermost part of the headrest before deployment. In FIG. 6*a*, the inflatable guide 2 has started to inflate. Thus, as shown in FIG. 6*b*, the remainder of the airbag 402 is deflected away from the backrest 28 and the occupant 401 of the seat. As the inflatable guide 2 contains to inflate, the remainder of the airbag 402 is orientated to as to unfurl around the backrest 28 and above the occupant 401 of the seat and so will not catch or snag on either the backrest 28 or the occupant 401. This is shown in FIG. 6*c*. In the final deployed state, shown in FIG. 6*d*, the inflatable guide 2 is fully inflated as is the remainder of the airbag 402. In this example, the inflatable guide 2 initially extends along the upper portion of the backrest 28, before transitioning into the airbag 402 which continues to extend along the upper portion of the backrest 28. The airbag 402 then continues to unfurl, and provides an upper portion which extends parallel to a roof of the vehicle to which the seat is fitted.

Figure 7A:
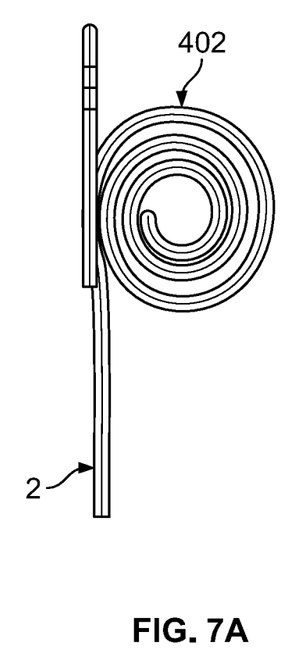
FIGS. 7a and 7b show schematic side-on views of an airbag package in an unpacked and packed configuration respectively.
Figure 7B:
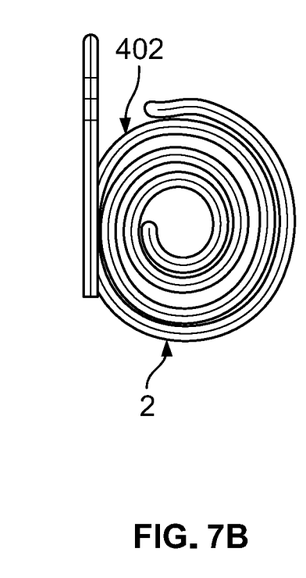

FIGS. 7*a* and 7*b* are transversal cross-sections taken through a central region of the airbag and show, respectively, a partially packaged and fully packaged airbag package according to the present invention. As shown in FIG. 7*a*, the inflatable guide 2 extends from a portion of the remaining airbag 402. In order to finish preparing the airbag package for installation, the inflatable guide is folded or rolled in front of the remaining airbag 402. This is shown in FIG. 7*b*.

Figure 8:
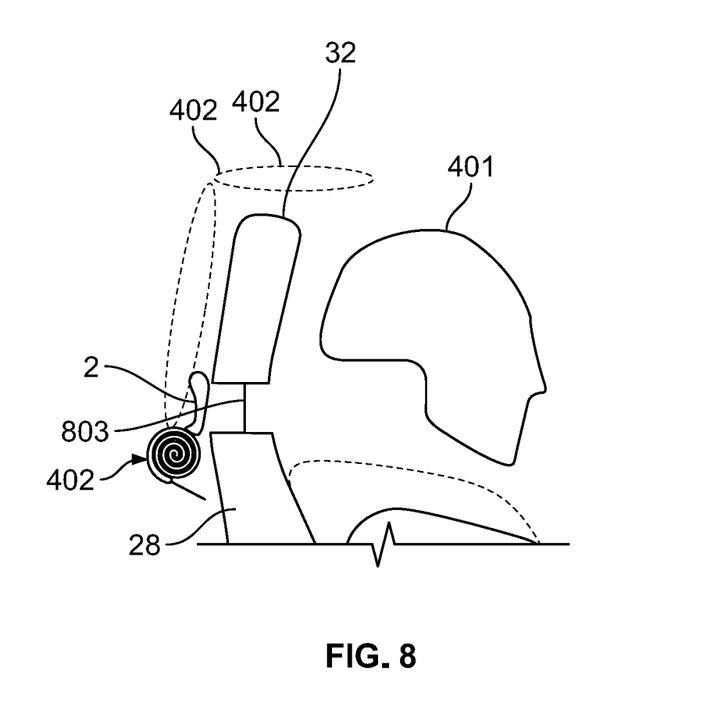
FIG. 8 shows a schematic side-on view of a vehicle seat during a stage of deployment of an airbag.

FIG. 8 shows the airbag 1 of the present invention in a partially deployed state in a variant backrest 28. In this example, the backrest 28 does not extend continuously to integrally form a headrest. Instead, a connecting unit 803, e.g. one or more connecting rods, bridges a gap between the backrest 28 and a headrest 32 and secures one to the other. In this example, it is important that the airbag 1 does not become tangled or caught either on the headrest 32 or the connecting unit 803, not does it become trapped in the gap between the backrest 28 and headrest 32. Therefore, after the inflatable guide 2 has inflated (as shown in FIG. 8) it bridges the gap between the backrest 28 and headrest 32, and directs the remaining airbag 402, to inflate in a similar manner to that described above. That is, the airbag inflates along the upper portion of the headrest 32 (in this example discrete from the backrest 28), before continuing to unfurl and provide an upper portion which extends parallel to a roof of the vehicle to which the seat is fitted. This is shown by the dotted lines in FIG. 8.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An airbag unit for a vehicle seat configured to support an occupant in a sitting position, the vehicle seat including a squab and a backrest, the airbag unit comprising:
    an inflatable airbag having a first inlet region and being provided in an initially rolled and/or folded airbag package, and an inflator actuable to direct inflating gas into the airbag via the first inlet region to inflate the airbag into an inflated configuration, the airbag comprising at least one inflatable chamber, which, when inflated into a deployed position, is configured to define an inflated shroud for extending over the sitting position and providing lateral protection to the occupant of the seat in the sitting position;
    wherein the airbag further comprises an inflatable guide, connected to the inflator and the inflatable chamber, the airbag being mounted and configured such that, upon actuation of the inflator to inflate the airbag, the inflatable guide is at least partially inflated before the at least one inflatable chamber for initially urging the inflatable chamber away from the backrest of the seat; the airbag being configured such that after the inflatable guide is at least partially inflated, the at least one inflatable chamber is inflated,
    wherein the inflatable guide is formed in a lobe of the airbag unit,
    wherein the inflatable guide is proximate to the first inlet region, and
    wherein the inflatable airbag is rolled and/or folded such that inflating gas reaches the inflatable guide before the at least one inflatable chamber.

2. The airbag unit of claim 1, wherein a first inflatable volume of the inflatable guide is smaller than a second inflatable volume of the inflatable chamber.

3. The airbag unit of claim 1, wherein the inflatable guide includes an inflatable volume which has one of a U shape and an elongated O shape.

4. The airbag unit of claim 1, wherein the inflatable guide comprises a first uninflatable region and a second uninflatable region, which are not fluidly connected to the inflator.

5. The airbag unit of claim 4, wherein the first uninflatable region and the second uninflatable region are spaced apart.

6. The airbag unit according to claim 4, wherein the first uninflatable region and the second uninflatable region are connected via an interconnecting seam.

7. The airbag unit according to claim 6, wherein the interconnecting seam and a seam around a periphery of the inflatable airbag define an inflatable volume of the inflatable guide.

8. The airbag unit according to claim 6, wherein the interconnecting seam and two seams around a periphery of the inflatable airbag define two inflatable volumes of the inflatable guide.

9. The airbag unit of claim 1, wherein the airbag comprises two inflatable chambers physically connected to one another via a connecting interface and fluidly isolated from one another.

10. The airbag unit of claim 9, wherein the airbag is one-piece woven, and the connecting interface is defined by a region of the airbag in which yarns of two constituent fabric layers of the airbag are interwoven.

11. The airbag unit of claim 1 in combination with the vehicle seat, wherein the inflatable guide of the airbag unit is provided in an upper portion of the backrest distal to the squab, and is configured, when inflated, to extend over the occupant.

12. The airbag unit of claim 1 in combination with the vehicle seat, wherein the airbag unit is provided in a rearward portion of the backrest, and is configured, when inflated, to extend around the backrest and over the occupant.

13. The airbag unit of claim 1, wherein the airbag is substantially symmetrical about an axis bisecting the inflatable guide.

14. The airbag unit of claim 1, wherein the lobe extends from an upper portion of the inflatable airbag.

15. The airbag unit of claim 14, wherein the inflatable airbag further has a second inlet region, the lobe located between the first inlet region and the second inlet region.

16. The airbag unit of claim 1, wherein the inflatable guide at least partially inflates before each of the at least one inflatable chamber.

17. An inflatable airbag for a vehicle seat, the inflatable airbag comprising:
    a plurality of inflatable chambers collectively deployable to an inflated position defining an inflated shroud for protecting an occupant of the vehicle seat;
    first and second inlet regions for receiving inflation gases from first and second inflators, respectively; and
    an inflatable guide between the first and second inlet regions;
    wherein the inflatable guide at least partially inflates before each of the plurality of inflatable chambers,
    wherein the inflatable guide is formed in an upwardly extending lobe of the inflatable airbag.

18. The inflatable airbag for a vehicle seat of claim 17, wherein the inflatable airbag is rolled and/or folded such that inflating gas reaches the inflatable guide before any of the inflatable chambers.

* * * * *